United States Patent
Kwon et al.

(10) Patent No.: US 10,405,232 B2
(45) Date of Patent: Sep. 3, 2019

(54) APPARATUS AND METHOD FOR LOAD BALANCING IN WIRELESS COMMUNICATION SYSTEM

(71) Applicant: Samsung Electronics Co., Ltd., Suwon-si, Gyeonggi-do (KR)

(72) Inventors: Eunhyun Kwon, Seoul (KR); Seungmin Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/547,345

(22) PCT Filed: Jan. 28, 2016

(86) PCT No.: PCT/KR2016/000909
§ 371 (c)(1),
(2) Date: Jul. 28, 2017

(87) PCT Pub. No.: WO2016/122220
PCT Pub. Date: Aug. 4, 2016

(65) Prior Publication Data
US 2018/0007584 A1 Jan. 4, 2018

(30) Foreign Application Priority Data

Jan. 28, 2015 (KR) .................. 10-2015-0013589

(51) Int. Cl.
*H04W 28/08* (2009.01)
*H04W 28/02* (2009.01)
(52) U.S. Cl.
CPC ....... *H04W 28/08* (2013.01); *H04W 28/0226* (2013.01); *H04W 28/0289* (2013.01)

(58) Field of Classification Search
None
See application file for complete search history.

(56) References Cited

U.S. PATENT DOCUMENTS

2011/0252477 A1 10/2011 Sridhar et al.
2012/0142352 A1* 6/2012 Zhang ............... H04W 36/0072
455/436
(Continued)

FOREIGN PATENT DOCUMENTS

KR 10-2015-0005421 A 1/2015
WO 2014116033 A1 7/2014

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 12); 3GPP TS 36.423; V12.9.0.
(Continued)

*Primary Examiner* — Diane L Lo
(74) *Attorney, Agent, or Firm* — Jefferson IP Law, LLP

(57) ABSTRACT

The present disclosure relates to a load balancing for a control in a wireless communication system. According to a various embodiments of the present disclosure, a method for operating a base station in a wireless communication system comprises determining a mobility of a terminal, and responsive to the mobility exceeding a threshold, transmitting, to the terminal, a message for requesting the terminal to process a control plane of the terminal with at least one other base station.

20 Claims, 13 Drawing Sheets

(56) References Cited

U.S. PATENT DOCUMENTS

| | | | |
|---|---|---|---|
| 2014/0003233 A1 | 1/2014 | Rune et al. | |
| 2014/0220974 A1* | 8/2014 | Hsu | H04W 36/0088 |
| | | | 455/436 |
| 2015/0023319 A1 | 1/2015 | Park et al. | |
| 2016/0050587 A1* | 2/2016 | Lam | H04W 28/08 |
| | | | 370/235 |
| 2016/0057658 A1* | 2/2016 | Horn | H04L 43/16 |
| | | | 370/236 |
| 2016/0165484 A1* | 6/2016 | Cui | H04W 28/08 |
| | | | 370/235 |
| 2017/0070895 A1* | 3/2017 | Zhang | H04W 24/02 |

OTHER PUBLICATIONS

3rd Generation Partnership Project; Technical Specification Group Radio Access Network; Evolved Universal Terrestrial Radio Access (E-UTRA); Radio Resource Control (RRC); Protocol Specification (Release 12); 3GPP TS 36.331; V12.14.0.

3rd Generation Partnership Project; Technical Specification Group Radio Access Network; Evolved Universal Terrestrial Radio Access (E-UTRA); User Equipment (UE) procedures in idle mode (Release 12); 3GPP TS 36.304; V12.8.0.

* cited by examiner

APPARATUS AND METHOD FOR LOAD BALANCING IN WIRELESS COMMUNICATION SYSTEM

TECHNICAL FIELD

The present disclosure relates to a load balancing in a wireless communication system.

BACKGROUND ART

Wireless communication system advance to provide a seamless communication service to users who are moving around. For doing so, the wireless communication system establishes a cellular network including a plurality of base stations, and each base station provides radio access to terminals in a certain geographical range. The certain geographical range is referred to as a cell, and an area serviced by one cell is referred to as a coverage. In current, a representative example of the wireless communication system for providing a high-speed data communication service includes a Long Term Evolution (LTE) system standardized by 3rd Generation Partnership Project (3GPP), and the LTE system can support high-speed packet based communication which can provide a data rate up to 100 Mbps.

In the wireless communication service over the cellular network, various obstacles can take place according to characteristics of a radio signal. The radio signal, which propagates over an air channel, can be easily blocked by a building or affected by interference. Hence, to address a coverage hole or shadowing problem, a hierarchical cell structure is suggested. According to the hierarchical cell structure, one small cell is deployed in a large cell. Since a distance between a base station and a terminal is relatively short in the small cell, it is easy to attain relatively good channel quality. Thus, the terminal in the small cell can easily access the small cell.

Since the small cell is included in the large cell, a coverage of the small cell is also included in a coverage of the large cell. A method for conducting more efficient communication using dual connectivity by not only accessing the small cell but also maintaining the access to both of the large cell and the small cell is suggested. Hence, the terminal can achieve more efficient communication using more resources.

As discussed above, the terminal can perform the communication using different cells and the multiple connections. In this case, the terminal has two serving base stations. As a result, the terminal has difficulty in determining the base station which controls the communication.

DISCLOSURE OF INVENTION

Technical Problem

An embodiment of the present disclosure provides an apparatus and a method for determining a base station which controls a terminal in a wireless communication system.

Another embodiment of the present disclosure provides an apparatus and a method for balancing load of a control plane in a wireless communication system.

Yet another embodiment of the present disclosure provides an apparatus and a method for balancing load of a control plane according to mobility of a terminal in a wireless communication system.

Still another embodiment of the present disclosure provides an apparatus and a method for determining mobility of a terminal in a wireless communication system.

A further embodiment of the present disclosure provides an apparatus and a method for determining a threshold to determine mobility of a terminal in a wireless communication system.

Solution to Problem

According to an embodiment of the present disclosure, a method for operating a base station in a wireless communication system comprises determining a mobility of a terminal, and responsive to the mobility exceeding a threshold, transmitting, to the terminal, a message for requesting the terminal to process a control plane of the terminal with at least one other base station.

According to another embodiment of the present disclosure, a method for operating a terminal in a wireless communication system comprises transmitting information regarding a mobility of the terminal, and receiving, from a base station, a message requesting the terminal to process a control plane of the terminal with at least one other base station which is selected based on the mobility.

According to yet another embodiment of the present disclosure, a base station in a wireless communication system comprises a processor configured to determine a mobility of a terminal, and at least one transceiver configured to transmit, to the terminal, a message for requesting the terminal to process a control plane of the terminal with at least one other base station responsive to the mobility exceeding a threshold.

According to still another embodiment of the present disclosure, a terminal in a wireless communication system comprises at least one transceiver configured to transmit information regarding a mobility of the terminal, and receive, from a base station, a message requesting the terminal to process a control plane of the terminal with at least one other base station which is selected based on the mobility.

Advantageous Effects of Invention

By balancing the load in consideration of user's mobility in the wireless communication system, problems when the load of the control plane is concentrated on a particular base station and thus a system performance is degraded can be addressed. Hence, even when a plurality of small cells is installed in one macro cell, mobility can be smoothly supported and easy scalability can be provided.

BEST MODE FOR CARRYING OUT THE INVENTION

Hereinafter, an operating principle of the present disclosure is described in detail with reference to the accompanying drawings. In the following, detailed descriptions on well-known functions or constructions will be omitted when it is deemed that they may unnecessarily obscure the subject matter of the present disclosure. Also, terminologies to be described below are defined in consideration of functions in the present disclosure and can vary depending on a user's or an operator's intention or practice. Thus, their definitions should be defined based on all the contents of the specification.

Hereinafter, the present disclosure provides a technique for load balancing in a wireless communication system. In particular, the present disclosure provides a technique for regulating the load of a control plane in the wireless communication system having a hierarchical cell structure.

In the following, terms indicating radio access technologies, terms indicating network entities, terms indicating cell types, and terms indicating connection states are for the sake of explanations. Accordingly, the present disclosure is not limited to the terms to be described, and can use other terms indicating objects having technically identical meaning.

Terms such as 'unit' and 'part' used herein indicate a unit for processing at least one function or operation, which can be implemented by hardware, software, or a combination of hardware and software.

To ease the understanding, the present disclosure employs some terms and names defined in 3rd Generation Partnership Project (3GPP) Long Term Evolution (LTE) standard. However, the present disclosure is not limited to those terms and names, and can be equally applied to a system conforming to other standards.

The wireless communication system according to an embodiment of the present disclosure can provide communication using multiple connections between a terminal and base stations. That is, the terminal can be serviced based on associations of multiple cells. The multiple connections considered in the present disclosure can be provided as shown in FIG. 1.

FIG. 1 depicts associations of a macro cell and a small cell. The small cell can be referred to as a pico cell or a femto cell. In FIG. 1, (a) depicts Carrier Aggregation (CA) between cells, (b) depicts dual connectivity, and (c) depicts association of cells based on interworking of heterogeneous networks.

Figure 1A:
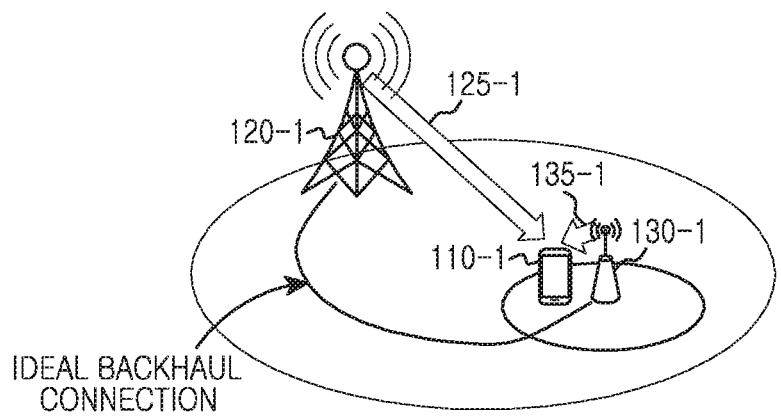
FIG. 1 depicts associations of cells in a wireless communication system according to an embodiment of the present disclosure.

Referring to FIG. 1A, a terminal 110-1 retains a connection 125-1 to a macro base station 120-1 and a connection 135-1 to a small base station 130-1. The macro base station 120-1 and the small base station 130-1 employ the same radio access technology. The CA requires high-speed data exchange between a Medial Access Control (MAC) layer and a physical layer of the base station. Accordingly, CA using subcarriers of different base stations requires stable and high-speed backhaul connection between the different base stations. The present disclosure supports an ideal backhaul connection between the macro base station 120-1 and the small base station 130-1. Hence, the macro base station 120-1 and the small base station 130-1 can perform the CA based on the ideal backhaul connection. That is, the CA using a plurality of forward carriers or a plurality of backward carriers is performed between base stations (e.g., the macro base station 120-1 and the small base station 130-1). Hence, the terminal 110 can operate in a CA mode between the base stations. The cell association of FIG. 1A can be referred to as an inter-base station CA.

Figure 1B:
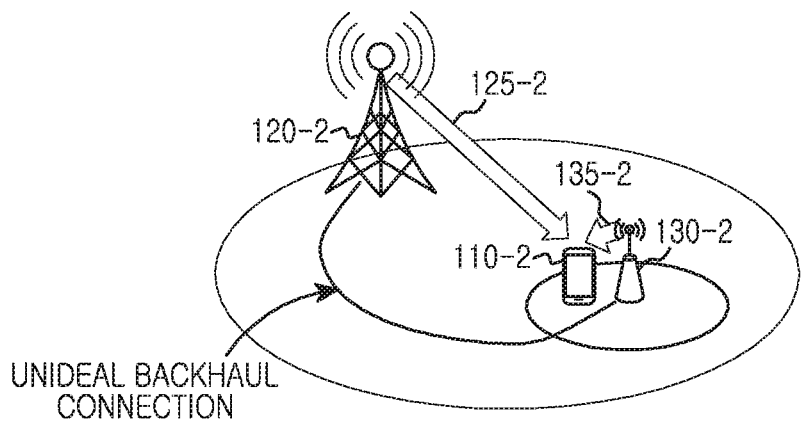

Referring to FIG. 1B, the terminal 110-2 retains a connection 125-2 to a macro base station 120-2 and a connection 135-2 to a small base station 130-2. The macro base station 120-2 and the small base station 130-2 employ the same radio access technology. Herein, an ideal backhaul connection between the macro base station 120-2 and the small base station 130-2 is not supported. Hence, the macro base station 120-2 and the small base station 130-2 cannot perform the CA operation. As a result, the macro base station 120-2 and the small base station 130-2 perform a dual connectivity operation instead of the CA. According to the dual connectivity, the macro base station 120-2 and the small base station 130-2 can perform separate operations in the physical layer and some layer above the MAC layer. That is, interworking between the macro base station 120-2 and the small base station 130-2 for the dual connectivity operation can be controlled by a higher layer than the MAC layer.

Figure 1C:
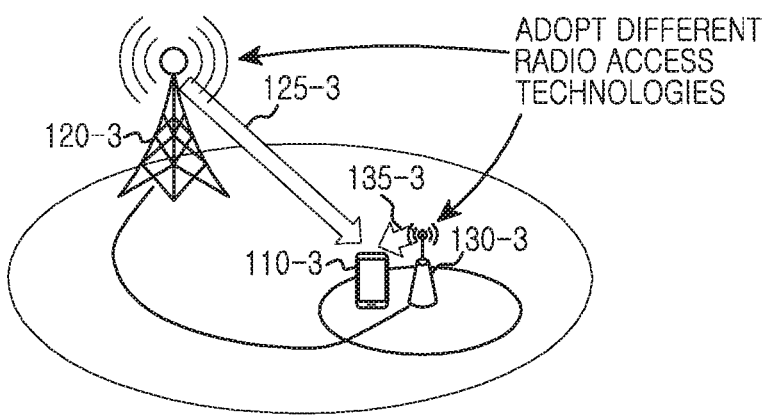

Referring to FIG. 1C, the terminal 110-3 retains a connection 125-3 to a macro base station 120-3 and a connection 135-3 to a small base station 130-3. The macro base station 120-3 and the small base station 130-3 employ different radio access technologies. For example, the macro base station 120-3 can adopt a mobile communication technology (e.g., LTE) for a cellular network, and the small base station 130-3 can adopt a Wireless Local Area Network (WLAN) technology (e.g., Wireless Fidelity (WiFi)). In this case, the cell association of FIG. 1C can be referred to as 3GPP/WLAN interworking. To secure a new frequency in order to satisfy increasing radio data demands, the heterogeneous network interworking of FIG. 1C can use data offloading which delivers the wireless data demand to the WLAN which uses an unlicensed band.

By providing the service using the inter-cell association as shown in FIG. 1, radio resource utilization and network performance can enhance. However, when small cells increase, frequent handovers can be caused. Accordingly, a control plane can be processed by a macro cell as shown in FIG. 2.

Figure 2:
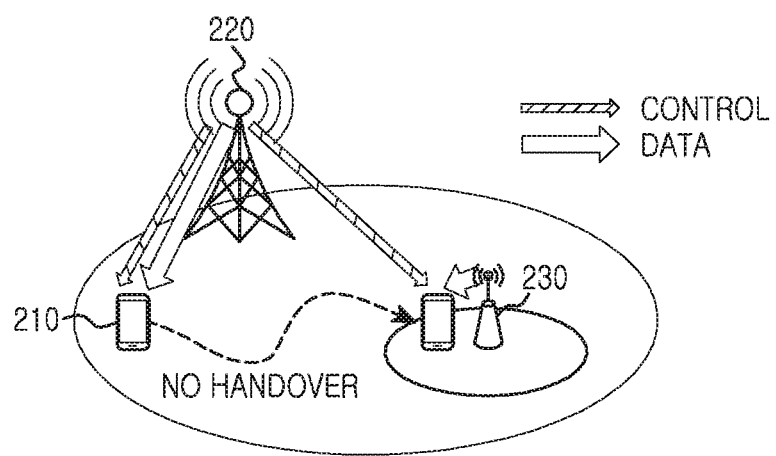
FIG. 2 depicts separation of a control plane and a data plane in a wireless communication system according to an embodiment of the present disclosure.

FIG. 2 depicts separation of a control plane and a data plane in a wireless communication system according to an embodiment of the present disclosure. FIG. 2 illustrates that a terminal 210 enters a cell of a small base station 230 belonging to a coverage of a macro base station 220.

Referring to FIG. 2, the terminal 210 resides inside the coverage of the macro base station 220 and outside the coverage of the small base station 230. Accordingly, the terminal 210 operates a control plane and a data plane with the macro base station 220. That is, data and control signaling of the terminal 210 are performed with the macro base station 220. Next, the terminal 210 enters the coverage of the small base station 230. Thus, the terminal 210 can operate the data plane with the small base station 230. In other words, data of the terminal 210 is transmitted to and received from the small base station 230. Although not depicted in FIG. 2, the terminal 210 can transmit and receive data to and from either of the macro base station 220 and the small base station 230 according to one of the methods of FIG. 1.

However, since the control plane and the data plane are separated, the control plane of the terminal 210 is still processed by the macro base station 220. That is, although the terminal 210 is mobile, the control plane of the terminal 210 is processed by the macro base station 220. For example, when the CA operation is performed between the macro base station 220 and the small base station 230, a primary (P) cell conducts a Radio Resource Control (RRC) procedure. For example, when the dual connectivity operation is performed between the macro base station 220 and the small base station 230, the macro base station 220 conducts the RRC procedure. For example, when the heterogeneous network interworking is performed between the macro base station 220 and the small base station 230, the macro base station 220 conducts the RRC procedure. Thus, although the terminal 210 enters the cell of the small base station 230, the terminal 210 may not conduct handover unless it leaves the coverage of the macro base station 220.

As described in FIG. 2, the separation of the control plane and the data plane can prevent frequency handovers and reduce signaling overhead. However, when the fixed base station for processing the control plane can cause the following problems.

When the control plane is fixed in the macro base station, that is, when only the macro cell supports the control plane of the terminal residing in the macro cell, resources for the macro cell control can be insufficient. As a result, control performance can degrade. Also, an uplink can lack uplink resources of the macro cell. Accordingly, the present disclosure now provides various embodiments for balancing a load of the control plane.

According to various embodiments of the present disclosure, the base station for processing the control plane of the terminal can change. Herein, the base station for processing the control plane indicates a base station which transmits and receives control messages (e.g., RRC messages) for the control plane to and from the terminal. Further, the base station for processing the control plane can indicate a base station which transmits and receives messages for the terminal control to and from higher nodes (e.g., a Mobility Management Entity (MME), a Serving Gateway (S-GW)) of a radio access network. According to embodiments of the present disclosure, the base station for processing the control plane of the terminal can change based on mobility of the terminal. The entity which processes the control plane according to embodiments of the present disclosure can be determined as shown in FIG. 3.

Figure 3:
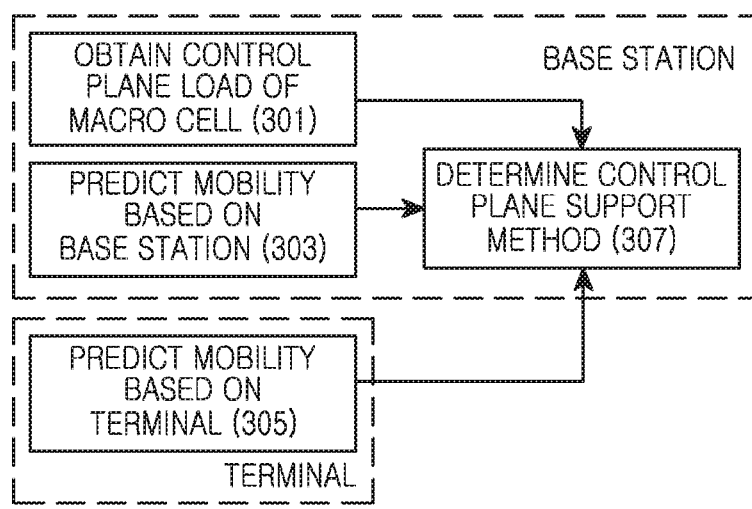
FIG. 3 depicts operations of a control plane in a wireless communication system according to an embodiment of the present disclosure.

FIG. 3 depicts operations of a control plane in a wireless communication system according to an embodiment of the present disclosure. FIG. 3 conceptually depicts determination of a base station for processing the control plane based on user mobility. Hereafter, to ease the understanding, the base station for processing the control plane is referred to as a control node.

Referring to FIG. 3, the control node determination includes obtaining a control plane load of a macro cell in operation 301, predicting the user mobility at the base station in operation 303, predicting the user mobility at the terminal in operation 305, and determining a support method of the control plane in operation 307.

In operation 301, the base station obtains an available resource status for the control plane in the macro cell. For example, the base station can obtain a load level based on a Resource Block (RB) usage and the number of connected terminals. Herein, the number of the connected terminals can be the number of terminals which establish connection in an RRC layer. The RB usage can be expressed as an average of a plurality of frames.

In operation 303, the base station determines the user mobility using at least one of various methods. For example, the base station can determine the user mobility using at least one of a cell residence time, a measurement report of the terminal, and a detection result of a reference signal of the terminal.

More specifically, the base station can determine the mobility based on the residence time in a last visited cell of history information of the terminal. In this case, for the longer residence time, less mobility can be determined. The history information can be received through an interface (e.g., X2 interface) between base stations or an interface between the base station and the MME. For example, the history information can indicate the residence time in a range from 0 to 4095 seconds.

For example, the base station can determine the mobility based on neighboring cell measurement results of the terminal. The measurement of the terminal can be triggered by various events. The terminal measures a signal strength from the neighboring cell and transmits a measurement report including the measurement result to a serving base station. Hence, the serving base station can predict the mobility based on a measurement result change obtained from multiple measurement reports. For example, the mobility can be determined based on a change and a changing speed of the neighboring cells in the measurement report, and a change level and a changing speed of the signal strength in the measurement report. More specifically, as the information in the measurement report changes rapidly and considerably, great mobility can be determined.

For example, the base station can determine the mobility based on a detection result of a discovery reference signal which is fed back from the terminal. The discovery reference signal is received from the small base station of the small cell to notify presence of the small cell. The small cell can be turned on/off for the sake of energy saving. Even in the off state, the discovery reference signal can be periodically transmitted to notify the presence of the small cell. The terminal receiving the discovery reference signal detects the discovery reference signal and reports a received strength to the serving base station, that is, to the macro base station. Hence, the serving base station can predict the mobility based on a detection result change obtained from multiple reports. For example, the mobility can be determined based on a change and a changing speed of the small cells in the report, and a change level and a changing speed of the received strength in the report. Specifically, for faster or greater information change in the report, greater mobility can be determined.

In operation 305, the terminal can determine the user's mobility using at least one of various methods. For example, the terminal can determine the mobility using at least one of a number of cell reselections, a number of handovers, a mobility speed, and a selection of a user. Herein, the operation 305 includes directly determining the mobility at the terminal, or providing necessary information for the mobility determination from the terminal to the base station. That is, the mobility can be determined by the terminal or the base station.

More specifically, the terminal can determine the mobility based on at least one of the number of cell reselections and the number of handovers. To determine when to perform the cell reselection and the handover, the terminal can internally manage a mobility state value indicating the mobility. The mobility state value is determined based on the number of cell reselections or the number of handovers of a certain time duration. For example, the mobility state can be divided into three of a high-mobility state, a medium-mobility state, and a normal-mobility state. In this case, greater mobility can be determined for the greater reselection count or number of handovers of the certain time duration.

For example, the terminal can determine the mobility based on the mobility speed. When the terminal includes a Global Positioning System (GPS) module, a position and a speed can be measured using the GPS. Hence, the terminal can determine the mobility using the speed measured based on the GPS. The GPS based speed measurement is conducted based on Doppler shift. That is, the terminal can detect a change of a wavelength of a propagation received from an artificial satellite according to the mobility speed, and estimate the speed from the change. In this case, as the mobility speed increases, greater mobility can be determined.

For example, the terminal can determine the mobility based on the selection of a user. That is, the terminal can display an interface for defining the mobility state or a preferred control node, and determine the mobility according to the selection of a user. Next, since the mobility of the terminal greatly depends on a user's intention, the mobility can be determined by the selection of a user. In so doing, to efficiently balance the load of the control plane, when the user selects a small cell, a policy which gives a certain benefit can be applied.

In operation 307, the base station determines the support method of the control plane based on the mobility of the terminal. That is, the base station determines whether to process the control plane in the macro cell or the small cell. In so doing, the base station can determine the control node based on the mobility determination result according to one of the above-stated methods, or based on the mobility determination results according to two or more methods. When the mobility determination results of two or more methods are used, different weights can be given to a plurality of mobility determination results. Specifically, the base station can determine the control node according to whether a value indicating the mobility exceeds a threshold. A condition of selecting the control node is shown in FIG. 4.

Figure 4:
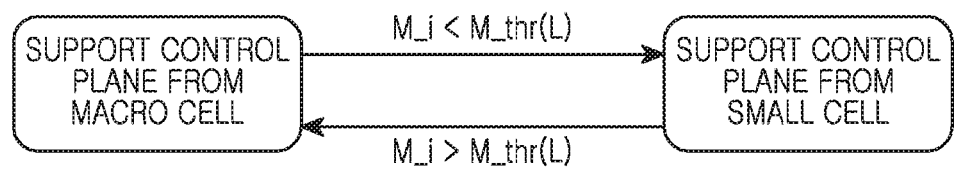
FIG. 4 depicts a condition for changing a cell which processes a control plane in a wireless communication system according to an embodiment of the present disclosure.

FIG. 4 depicts a condition for changing a cell which processes a control plane in a wireless communication system according to an embodiment of the present disclosure.

In FIG. 4, $M\_i$ denotes a mobility value of a terminal i, $M\_thr(L)$ denotes a threshold, and L denotes a load on the control plane of a macro cell. The mobility value $M\_i$ is a value indicating the mobility determined through a combination of one or more of the above-stated mobility determination methods. Also, the threshold $M\_thr(L)$ which is the basis of the control node selection can vary according to the load L of the control plane of the macro base station. That is, $M\_thr(L)$ which is the basis of the control node selection can be determined based on the load L on the control plane of the macro cell. The threshold $M\_thr(L)$ can increase as the load of the macro cell increases. Hence, as the load of the macro cell increases, it is more likely that the small cell is selected as the control node. That is, when the $M\_thr(L)$ value is proportional to the L value, for a great load on the control plane of the macro cell, the macro cell supports the control plane only for the terminal of considerable mobility. By contrast, for a small load on the control plane of the macro cell, the macro cell supports the control plane even for the terminal of less mobility.

That is, the base station determines the threshold based on the load of the control plane, and selects the control node by comparing the threshold and the mobility. As shown in FIG. 4, when the mobility is less than the threshold, the small cell is selected as the control node. By contrast, when the mobility exceeds the threshold, the macro cell is selected as the control node. That is, when the mobility of the terminal i is considerable, that is, when $M\_i > M\_thr(L)$, the control plane of the terminal i is supported by the macro cell. By contrast, when the mobility of the terminal i is small, that is, when $M\_i < M\_thr(L)$, the control plane of the terminal i is supported by the small cell.

Figure 5:
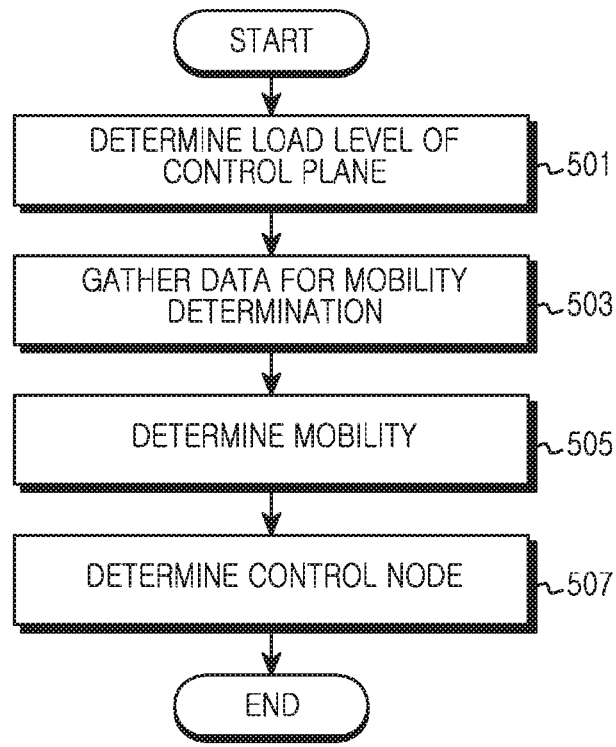
FIG. 5 depicts a procedure for determining a control node in a wireless communication system according to an embodiment of the present disclosure.

FIG. 5 depicts a method for determining a control node in a wireless communication system according to an embodiment of the present disclosure. FIG. 5 illustrates an operating method of a base station for selecting the control node as shown in FIG. 3.

Referring to FIG. 5, the base station determines a load level of a control plane in operation 501. That is, the base station checks the load of the control plane of the base station. For example, the base station can determine the load level based on at least one of a RS usage and the number of connected terminals.

Next, the base station gathers data for mobility determination in operation 503. For example, the data can be gathered based on at least one of a cell residence time of the terminal, a measurement report of the terminal, a detection result of a reference signal of the terminal, a number of cell reselections of the terminal during a certain time, a number of handovers of the terminal during a certain time, a mobility speed of the terminal, and a selection of a user result of the terminal. The data for the mobility determination can be provided from the terminal or other node (e.g., an MME) of a radio access network.

Next, the base station determines the mobility of the terminal in operation 505. The mobility is determined based on the data for the mobility determination. For example, as the cell reselection time shortens, the base station can determine greater mobility. Alternatively, for a greater information change of the measurement report, the base station can determine greater mobility. Alternatively, for a greater information change in the detection result of a reference signal, the base station can determine greater mobility. Alternatively, for a greater number of cell reselections, the base station can determine greater mobility. Alternatively, for a greater number of handovers, the base station can determine greater mobility. Alternatively, for a greater mobility speed, the base station can determine greater mobility. According to another embodiment of the present disclosure, the mobility can be determined by the terminal. In this case, the base station can receive information notifying the mobility from the terminal in operation 503, and obtain the mobility indicated by the received information in operation 505.

Next, the base station determines the control node in operation 507. That is, the base station selects a base station for processing the control plane of the terminal. For doing so, the base station determines a threshold for determining the control node, and compares the mobility and the threshold. The threshold is determined based on the load level determined in the operation 501. For example, the threshold can be proportional to the load level. When the mobility is greater than the threshold, the base station selects the macro base station, that is, the base station as the control node. By contrast, when the mobility is small than or equal to the threshold, the base station selects the small base station as the control node.

In the embodiment of FIG. 5, the control node is determined according to the determination of the base station. According to another embodiment of the present disclosure, the determination of the control node can include negotiation between the macro base station and the small base station. That is, when the load on the control plane of the small base station is considerable, it can be disadvantageous to select the small base station as the control node. Hence, the macro base station can transmit a message inquiring about control node functionality, to the small base station. Thus, the small base station can determine whether to process the control plane based on the load, and then transmit a message notifying a determination result.

The determination procedure of the control node according to an embodiment of the present disclosure in FIG. 5 can be performed when the terminal enters a service coverage of the small cell. Also, the determination procedure of the control node according to an embodiment of the present disclosure can be conducted when the terminal leaves the service coverage of the small cell. Also, the determination procedure of the control node according to an embodiment of the present disclosure can be performed when the terminal remains in the coverage of the small cell over a certain time. The present disclosure now explains operations of the base station in each case by referring to FIG. 6, FIG. 7, and FIG. 8.

Figure 6:
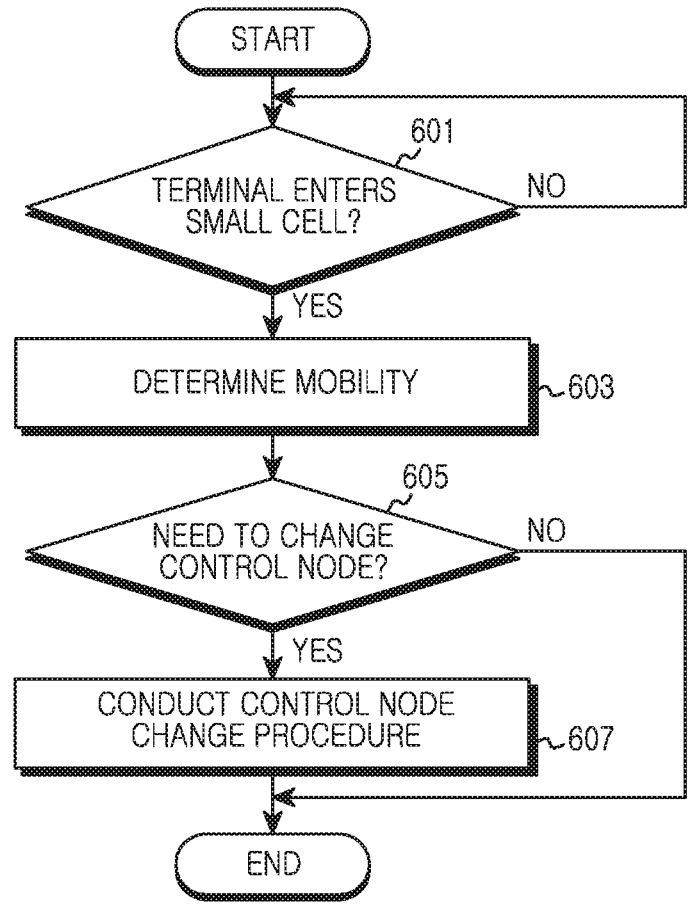
FIG. 6 depicts operations of a base station for changing a control node in a wireless communication system according to an embodiment of the present disclosure.

FIG. 6 depicts operations of a base station for changing a control node in a wireless communication system according to an embodiment of the present disclosure. FIG. 6 illustrates an operating method of the macro base station when a terminal enters a coverage of the small cell. Before starting the procedure of FIG. 6, a control node for the terminal is the base station.

Referring to FIG. 6, the base station determines whether the terminal enters the small cell in operation 601. The base station can determine that the terminal enters the small cell coverage based on information reported from the terminal such as a measurement report. For example, when a channel quality for the small cell in the measurement report received from the terminal is greater than a channel quality for the base station by a reference value, the base station can determine the entrance to the small cell.

When the terminal enters the small cell, the base station determines mobility of the terminal in operation 603. For doing so, the base station can receive data required to determine the mobility, from the terminal. Alternatively, according to another embodiment of the present disclosure, the base station can receive information notifying the mobility determined by the terminal, from the terminal.

Next, the base station determines whether to change the control node in operation 605. For doing so, the base station determines a threshold according to a load level of the base station. The base station compares the mobility and the threshold. When the mobility is greater than the threshold, the base station can determine to change the control node to the small cell. When determining not to change the control node, the base station finishes this procedure. That is, when expecting that the terminal will leave the small cell coverage soon, the base station continuously supports the control plane of the terminal.

By contrast, when determining to change the control node, the base station performs a control node change procedure in operation 607. That is, when expecting that the terminal will stay in the small cell coverage for a long term, the base station controls the small base station to support the control plane of the terminal. For example, the base station can transmit a message instructing to change the control node to the terminal. Also, the base station can transmit a message requesting to operate as the control node, to the small base station. The terminal can transmit and receive control messages for the control plane to and from the small base station.

Although not depicted in FIG. 6, regardless of the control node change, a service through association between the macro cell and the small cell of the base station can be provided for the terminal. Namely, CA or dual connectivity between the macro base station and the small base station can be supported. When the macro base station and the small base station adopt different radio access technologies, heterogeneous network interworking can be provided. Hence, the data plane of the terminal can be processed by both of the base station and the small base station.

Although not depicted in FIG. 6, when determining to change the control node, the base station can perform a negotiation procedure with the small base station. Specifically, the base station can transmit to the small base station a message inquiring about whether it can function as the control node, that is, whether it can process the control plane of the terminal, and receive a response message. When the response message indicates no control plane processing, the base station can continuously support the control plane of the terminal.

In the embodiment of FIG. 6, the control node can be changed in various manners.

According to an embodiment of the present disclosure, the control node can be changed to the small base station by changing the entity which processes the control plane of the terminal in the radio access network to the small base station. In this case, in terms of the radio access network, through a similar procedure to the handover, the entity for processing the control plane of the terminal is changed to the small base station. Thus, the control messages for the control plane of the terminal are processed by the small base station.

Alternatively, according to another embodiment of the present disclosure, the control node can be changed to the small base station by relaying the control messages for the control plane between the terminal and the macro base station via the small base station. In this case, in terms of the radio access network, the entity for processing the control plane of the terminal is still the macro base station. Accordingly, while the control messages are transmitted and received over the resources of the small cell, the control messages are processed by the macro base station.

Figure 7:
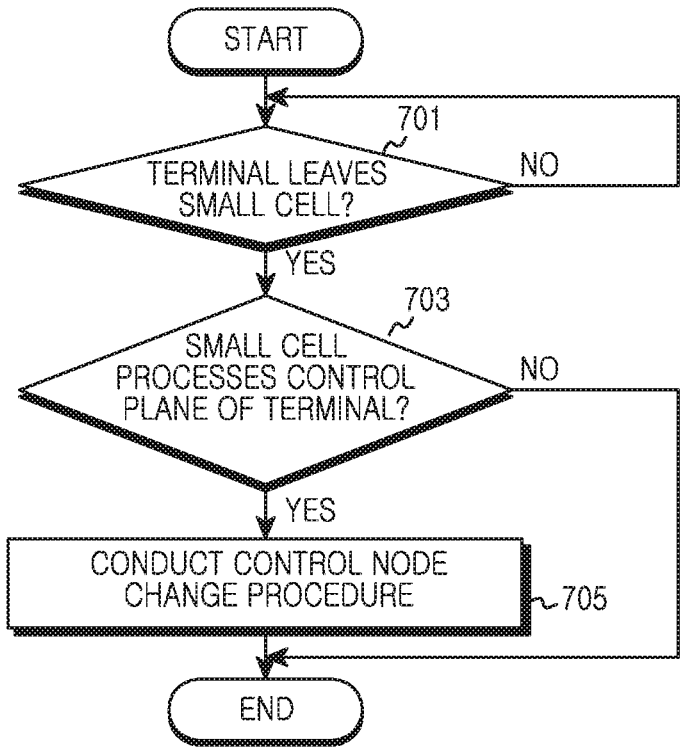
FIG. 7 depicts operations of a base station for changing a control node in a wireless communication system according to another embodiment of the present disclosure.

FIG. 7 depicts operations of a base station for changing a control node in a wireless communication system according to another embodiment of the present disclosure. FIG. 7 illustrates an operating method of the macro base station when the terminal leaves the coverage of the small cell.

Referring to FIG. 7, the base station determines whether the terminal leaves the small cell in operation 701. The base station can determine that the terminal leaves the coverage of the small cell through information reported from the terminal such as measurement report. For example, when a channel quality for the base station in the measurement report received from the terminal is greater than a channel quality for the small cell by a reference value, the base station can determine that the terminal leaves the small cell.

When the terminal leaves the small cell, the base station determines whether the control plane of the terminal is processed by the small cell in operation 703. That is, the base station checks whether the current control node for the terminal is the small cell. When the control node is not the small cell, the base station finishes this procedure. That is, when the control node is the base station, there is no need to re-change the control node and thus the base station finishes this procedure.

By contrast, when the control node is the small cell, the base station performs the control node change procedure in operation 705. That is, when the terminal leaves the small cell coverage, regardless of the mobility of the terminal, the small cell cannot process the control plane any more. Hence, the base station controls the base station to support the control plane of the terminal. For example, the base station can transmit and receive messages requesting not to operate as the control node, to the small base station. Hence, the terminal can transmit and receive the control messages for the control plane to and from the base station.

Although not depicted in FIG. 7, regardless of the control node change, the service for the terminal through the association between the macro cell and the small cell of the base station can be interrupted. In other words, the CA or the dual connectivity between the macro base station and the small base station can be suspended. When the radio access technologies adopted by the macro base station and the small base station are different from each other, the heterogeneous network interworking can be suspended. Thus, the data plane of the terminal can be processed by the base station.

Figure 8:
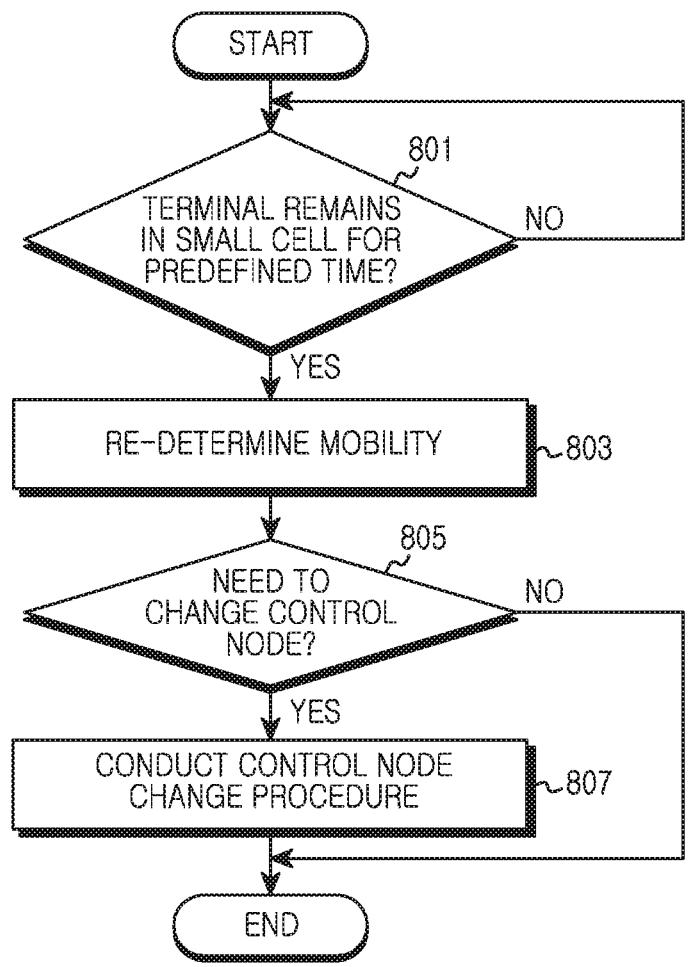
FIG. 8 depicts operations of a base station for changing a control node in a wireless communication system according to yet another embodiment of the present disclosure.

FIG. 8 depicts operations of a base station for changing a control node in a wireless communication system according to yet another embodiment of the present disclosure. FIG. 8 illustrates an operating method of the macro base station when the terminal enters the small cell coverage but the control node is maintained, and then the terminal remains in the small cell over a certain time. Before starting the procedure of FIG. 8, the control node for the terminal is the base station.

Referring to FIG. 8, the base station determines whether the terminal enters the small cell and then remains in the small cell for a predefined time in operation 801. The base station can determine whether the terminal leaves the small cell coverage based on information reported from the terminal such as measurement report. Thus, when the terminal does not leave the small cell for the predefined time, the base station can determine that the terminal remains in the small cell for the predefined time. For doing so, when the terminal enters the small cell, the base station starts a timer for measuring the predefined time. When the timer expires, the base station can determine that the terminal remains in the small cell for the predefined time.

When the terminal remains in the small cell for the predefined time, the base station re-determines mobility of the terminal in operation 803. For doing so, the base station can receive data required to determine the mobility, from the terminal. Alternatively, according to still another embodiment of the present disclosure, the base station can receive information notifying the mobility determined by the terminal, from the terminal.

Next, the base station determines whether to change the control node in operation 805. For doing so, the base station determines a threshold according to a load level of the base station. The base station compares the mobility and the threshold. When the mobility is greater than the threshold, the base station can determine to change the control node to the small cell. When determining not to change the control node, the base station finishes this procedure. That is, when expecting that the terminal will leave the small cell coverage soon, the base station continuously supports the control plane of the terminal.

By contrast, when determining to change the control node, the base station performs a change procedure for the control node in operation 807. That is, when expecting that the terminal will stay in the small cell coverage for a long term, the base station controls the small base station to support the control plane of the terminal. For example, the base station can transmit a message instructing to change the control node to the terminal. Also, the base station can transmit a message requesting to operate as the control node, to the small base station. The terminal can transmit and receive control messages for the control plane to and from the small base station.

In the embodiment of FIG. 8, when the terminal remains in the small cell for the predefined time, the mobility can be re-determined and the control node can be changed or maintained based on the mobility. However, according to still another embodiment of the present disclosure, when the terminal remains in the small cell for the predefined time, the control node can be switched to the small base station without determining the mobility. That is, merely staying for the predefined time can change the control node. In this case, when the terminal remains in the small cell for the predefined time in the operation 801, the base station can omit the operations 803 and 805 and proceed to the operation 807.

Figure 9:
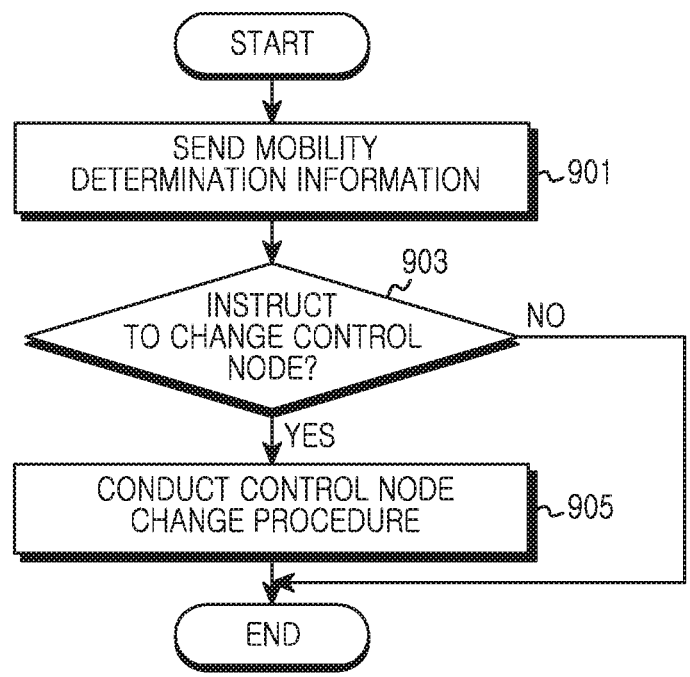
FIG. 9 depicts operations of a terminal for changing a control node in a wireless communication system according to an embodiment of the present disclosure.

FIG. 9 depicts operations of a terminal for changing a control node in a wireless communication system according to an embodiment of the present disclosure. FIG. 9 illustrates an operating method of the terminal corresponding to the operating method of the base station of FIG. 5, FIG. 6, FIG. 7, and FIG. 8.

Referring to FIG. 9, the terminal transmits information about mobility determination in operation 901. For example, the information about the mobility determination can include necessary data for determining the mobility at the base station. For example, the information about the mobility determination can include information notifying mobility determined by the terminal.

Next, the terminal determines whether the control node change is instructed in operation 903. In other words, the terminal determines whether a message instructing the control node change is received. The control node change can be instructed by a current control node. When the control node change is not instructed, the terminal finishes this procedure.

By contrast, when the control node change is instructed, the terminal performs the control node change procedure in operation 905. Hence, the terminal transmits and receives control messages for the control plane to and from the changed control node. For example, the terminal can receive a broadcast channel and a control channel of the changed control node. Also, the terminal can transmit control information (e.g., measurement report) to the changed control node.

In the various embodiments of the present disclosure as described above, when the terminal enters the small cell or remains in the small cell over the certain time, the macro base station can select and change the control node. In so doing, the terminal can enter an overlapping region of small cell coverages. In this case, when determining that the mobility of the terminal is not great, the macro base station can select one of two or more small base stations as the control node. In so doing, a small base station having a relatively good channel quality, a small base station having a low load, or a small base station having good performance predicted by considering the channel quality or the load can be selected from the small base stations.

Figure 10:
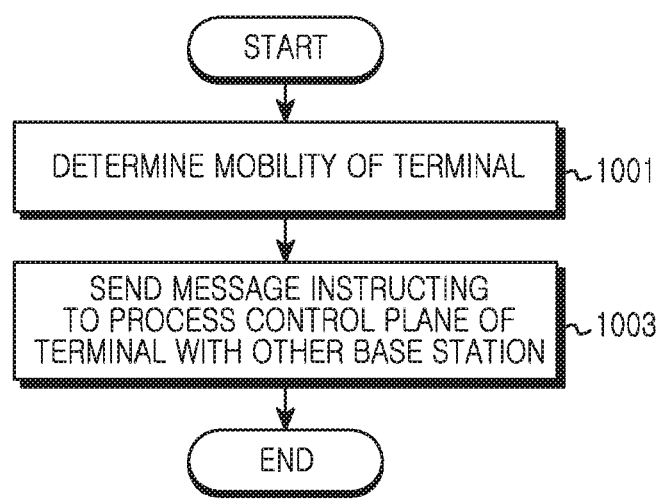
FIG. 10 depicts operations of a base station in a wireless communication system according to an embodiment of the present disclosure.

FIG. 10 depicts operations of a base station in a wireless communication system according to an embodiment of the present disclosure. FIG. 10 illustrates an operating method of the base station which balances a load based on mobility of a terminal.

Referring to FIG. 10, the base station determines the mobility of the terminal in operation 1001. For doing so, the base station can receive data for determining the mobility, or information notifying mobility determined by the terminal. For example, the data can include at least one of a residence time for a last visited cell of the terminal, a measurement report of the terminal, a detection result of a reference signal of the terminal, a number of cell reselections of the terminal, a number of handovers of the terminal, a mobility speed of the terminal, and a selection of a user of the terminal.

Next, the base station transmits a message instructing to process the control plane of the terminal with other base station, to the terminal in operation 1003. That is, when the mobility exceeds a threshold, the base station determines that the other base station functions as the control node of the terminal. For doing so, the base station can determine the threshold based on a load level on the control plane of the base station.

Figure 11:
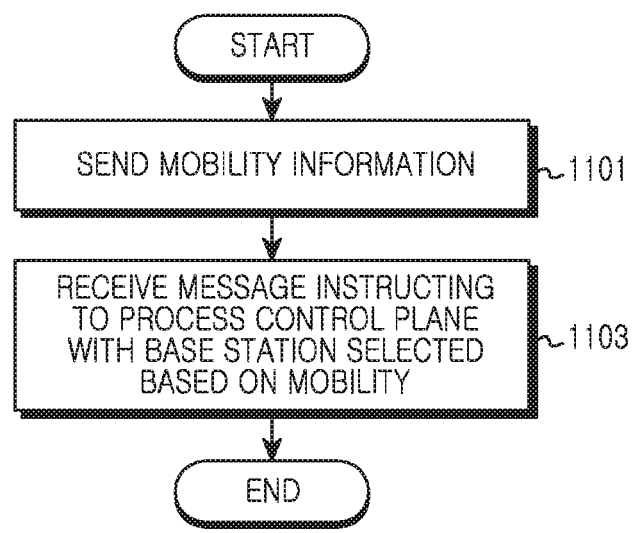
FIG. 11 depicts operations of a terminal in a wireless communication system according to an embodiment of the present disclosure.

FIG. 11 depicts operations of a terminal in a wireless communication system according to an embodiment of the present disclosure. FIG. 11 illustrates an operating method of the terminal for changing a control node based on mobility.

Referring to FIG. 11, the terminal transmits information about the terminal mobility in operation 1101. Herein, the mobility information includes data for determining the mobility, or data notifying mobility determined by the terminal. That is, the mobility can be determined by the terminal, or by the base station.

Next, the terminal receives a message instructing to process a control procedure for the control plane with the selected base station based on the mobility in operation 1103. The message can be received when the control node for processing the control plane is changed. Hence, the terminal can perform the procedure for changing the control node, and transmit and receive control messages to and from the changed control node.

Figure 12:
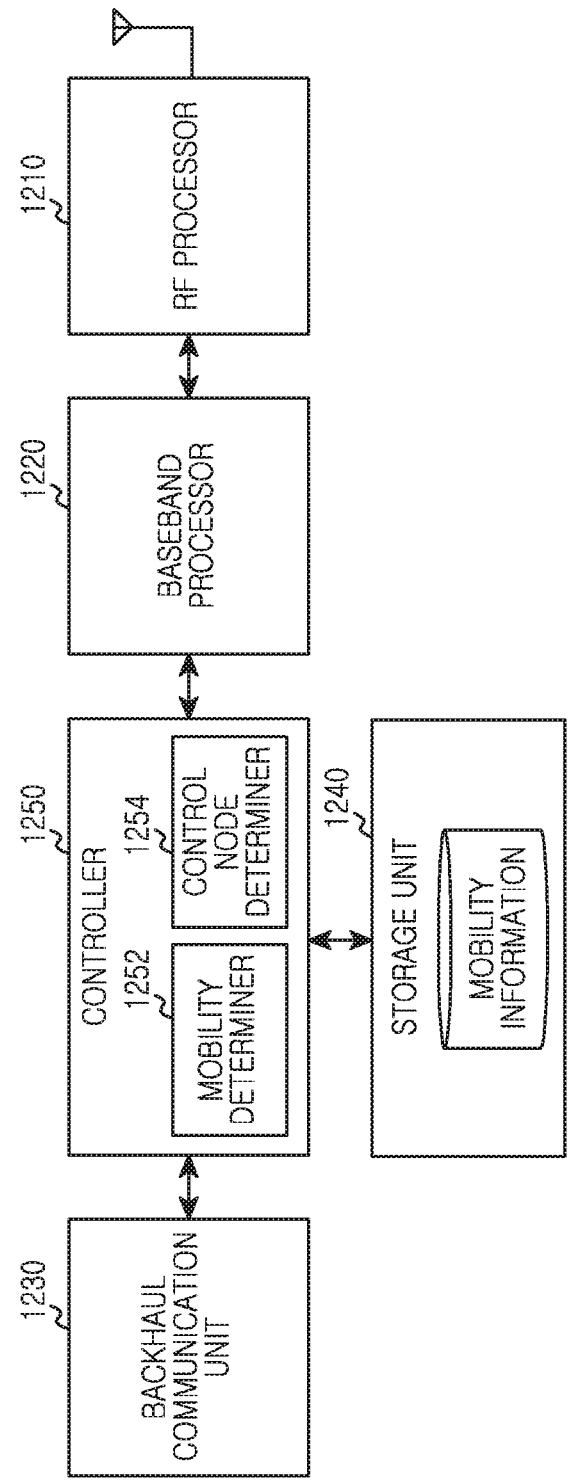
FIG. 12 depicts a block diagram of a base station in a wireless communication system according to an embodiment of the present disclosure.

FIG. 12 depicts a block diagram of a base station in a wireless communication system according to an embodiment of the present disclosure. FIG. 12 illustrates a block diagram of a macro base station.

As shown in FIG. 12, the base station includes a Radio Frequency (RF) processor 1210, a baseband processor 1220, a backhaul communication unit 1230, a storage unit 1240, and a controller 1250.

The RF processor 1210 performs functions, such as signal band conversion and amplification, for transmitting and receiving signals over a radio channel. That is, the RF processor 1210 up-converts a baseband signal fed from the baseband processor 1220 to an RF band signal, transmits it over an antenna, and down-converts an RF band signal received via the antenna to a baseband signal. For example, the RF processor 1210 can include a transmit filter, a receive filter, an amplifier, a mixer, an oscillator, a Digital to Analog Convertor (DAC), an Analog to Digital Convertor (ADC), and the like. In FIG. 12, although the single antenna is depicted, the base station can include a plurality of antennas. Also, the RF processor 1210 can include a plurality of RF chains. Further, the RF processor 1210 can perform beamforming. For the beamforming, the RF processor 1210 can adjust a phase and a magnitude of signals transmitted and received via a plurality of antennas or antenna elements.

The baseband processor 1220 performs a function for converting a baseband signal and a bit stream according to a physical layer standard of a system. For example, in data transmission, the baseband processor 1220 generates complex symbols by encoding and modulating a transmit bit stream. Also, in data reception, the baseband processor 1220 restores a receive bit stream by demodulating and decoding the baseband signal fed from the RF processor 1210. For example, according to an Orthogonal Frequency Division Multiplexing (OFDM) method, in the data transmission, the baseband processor 1220 generates the complex symbols by encoding and modulating the transmit bit stream, maps the complex symbols to subcarriers, and generates OFDM symbols through an Inverse Fast Fourier Transform (IFFT) operation and Cyclic Prefix (CP) insertion. Also, in the data reception, the baseband processor 1220 splits the baseband signal fed from the RF processor 1210 to OFDM symbols, restores signals mapped to subcarriers through an FFT operation, and then restores a receive bit stream by demodulating and decoding. The baseband processor 1220 and the RF processor 1210 transmit and receive the signals as described above. Accordingly, the baseband processor 1220 and the RF processor 1210 can be referred to as a transmitter, a receiver, a transceiver, a communication unit, or a wireless communication unit.

The backhaul communication unit 1230 provides an interface for communicating other nodes in a network. That is, the backhaul communication unit 1230 converts a bit stream transmitted from the base station to other node, for example, to other base station (e.g., a small base station, an AP, etc.) or a core network, and converts a physical signal received from the other node to a bit stream.

The storage unit 1240 stores a basic program for operating the base station, an application program, and data such as setting information. In particular, the storage unit 1240 can store mobility information provided from the terminal. The mobility information can include data for determining the mobility. For example, the data can include at least one of a residence time for a last visited cell of the terminal, a measurement report of the terminal, a detection result of a reference signal of the terminal, a number of cell reselections of the terminal, a number of handovers of the terminal, a mobility speed of the terminal, and a selection of a user of the terminal. The storage unit 1240 provides the stored data according to a request of the controller 1250.

The controller 1250 controls general operations of the base station. For example, the controller 1250 transmits and receives signals through the baseband processor 1220 and the RF processor 1210 or through the backhaul communication unit 1230. Also, the controller 1250 records and reads data to and from the storage unit 1240. For doing so, the controller 1250 can include at least one processor. According to an embodiment of the present disclosure, the controller 1250 includes a mobility determiner 1252 for determining the mobility of the terminal based on the data stored in the storage unit 1240, and a control node determiner 1254 for selecting a control node for the terminal based on the mobility. For example, the controller 1250 can control the base station to carry out the procedure of FIG. 3, FIG. 4, FIG. 5, FIG. 6, FIG. 7, FIG. 8, FIG. 9, or FIG. 10. The operations of the controller 1250 according to an embodiment of the present disclosure are as follows.

According to an embodiment of the present disclosure, the controller 1250 determines the mobility of the terminal. For doing so, the controller 1250 can receive data for determining the mobility through the RF processor 1210 and the baseband processor 1220, or receive information notifying mobility determined by the terminal. The controller 1250 transmits a message instructing to process the control plane of the terminal with other base station to the terminal through the RF processor 1210 and the baseband processor 1220. That is, when the mobility exceeds a threshold, the controller 1250 determines that the other base station functions as the control node of the terminal. For doing so, the controller 1250 can determine the threshold based on a load level on the control plane of the base station.

Figure 13:
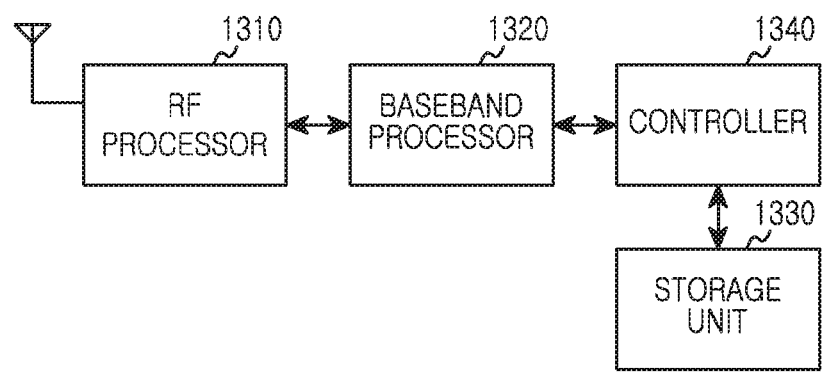
FIG. 13 depicts a block diagram of a terminal in a wireless communication system according to an embodiment of the present disclosure.

FIG. 13 depicts a block diagram of a terminal in a wireless communication system according to an embodiment of the present disclosure.

As shown in FIG. 13, the terminal includes an RF processor 1310, a baseband processor 1320, a storage unit 1330, and a controller 1340.

The RF processor 1310 performs functions, such as signal band conversion and amplification, for transmitting and receiving signals over a radio channel. The RF processor 1310 up-converts a baseband signal fed from the baseband processor 1320 to an RF band signal, transmits it over an antenna, and down-converts an RF band signal received via the antenna to a baseband signal. For example, the RF processor 1310 can include a transmit filter, a receive filter, an amplifier, a mixer, an oscillator, a DAC, an ADC, and the like. In FIG. 13, although the single antenna is depicted, the terminal can include a plurality of antennas. Also, the RF processor 1310 can include a plurality of RF chains. Further, the RF processor 1310 can perform beamforming. For the beamforming, the RF processor 1310 can adjust a phase and a magnitude of signals transmitted and received through a plurality of antennas or antenna elements.

The baseband processor 1320 performs a function for converting a baseband signal and a bit stream according to a physical layer standard of a system. For example, in data transmission, the baseband processor 1320 generates complex symbols by encoding and modulating a transmit bit stream. Also, in data reception, the baseband processor 1320 restores a receive bit stream by demodulating and decoding a baseband signal fed from the RF processor 1310. For example, according to the OFDM method, in the data transmission, the baseband processor 1320 generates the complex symbols by encoding and modulating the transmit bit stream, maps the complex symbols to subcarriers, and generates OFDM symbols through an IFFT operation and CP insertion. Also, in the data reception, the baseband processor 1320 splits the baseband signal fed from the RF processor 1310 to OFDM symbols, restores signals mapped to subcarriers through an FFT operation, and then restores a receive bit stream by demodulating and decoding.

The baseband processor 1320 and the RF processor 1310 transmit and receive the signals as described above. Accordingly, the baseband processor 1320 and the RF processor 1310 can be referred to as a transmitter, a receiver, a transceiver, or a communication unit. Further, at least one of the baseband processor 1320 and the RF processor 1310 can include a plurality of communication modules for supporting a plurality of different communication standards. Also, at least one of the baseband processor 1320 and the RF processor 1310 include different communication modules for processing signals of different frequency bands. For example, the different communication standards can include the WLAN (e.g., Institute of Electrical and Electronics Engineers (IEEE) 802.11), the cellular network (e.g., LTE), and the like. Also, the different frequency bands can include a Super High Frequency (SHF) (e.g., 2.5 GHz, 5 GHz) band, and a millimeter weave (e.g., 60 GHz) band.

The storage unit 1330 stores a basic program for operating the terminal, an application program, and data such as setting information. In particular, the storage unit 1330 can store data for determining the mobility of the terminal. For example, the data can include at least one of a residence time for a last visited cell of the terminal, a measurement report of the terminal, a detection result of a reference signal of the terminal, a number of cell reselections of the terminal, a number of handovers of the terminal, a mobility speed of the terminal, and a selection of a user of the terminal. The storage unit 1330 provides the stored data according to a request of the controller 1340.

The controller 1340 controls general operations of the terminal. For example, the controller 1340 transmits and receives signals through the baseband processor 1320 and the RF processor 1310. Also, the controller 1340 records and reads data to and from the storage unit 1330. For doing so, the controller 1340 can include at least one processor. For example, the controller 1340 can include a Communication Processor (CP) for controlling communication and an Application Processor (AP) for controlling a high layer such as application program. According to an embodiment of the present disclosure, the controller 1340 can change the control node under control of the base station. For example, the controller 1340 can control the terminal to carry out the procedure of FIG. 11. The operations of the controller 1340 according to an embodiment of the present disclosure are as follows.

According to an embodiment of the present disclosure, the controller 1340 transmits mobility information of the terminal. Herein, the mobility information includes data for determining the mobility, or information notifying mobility determined by the controller 1340. Next, the controller 1340 receives a message instructing to process the control procedure for the control plane with the base station selected based on the mobility through the RF processor 1310 and the baseband processor 1320. The message can be received when the control node for processing the control plane is changed. Hence, the controller 1340 can perform the procedure for changing the control node, and transmit and receive control messages to and from the changed control node.

The methods according to embodiments described in the claims or the specification of the present disclosure can be implemented in software, firmware, hardware, or in their combinations.

As for the software, a computer-readable storage medium storing one or more programs (software modules) can be provided. One or more programs stored in the computer-readable storage medium can be configured for execution by one or more processors of an electronic device. One or more programs can include instructions for enabling the electronic device to execute the methods according to the embodiments described in the claims or the specification of the present disclosure.

Such a program (software module, software) can be stored to a random access memory, a non-volatile memory including a flash memory, a Read Only Memory (ROM), an Electrically Erasable and Programmable ROM (EEPROM), a magnetic disc storage device, a Compact Disc (CD)-ROM, Digital Versatile Discs (DVDs) or other optical storage devices, and a magnetic cassette. Alternatively, the program can be stored to a memory combining part or all of those recording media. Also, a plurality of memories may be included.

Also, the program can be stored in an attachable storage device accessible via a communication network such as Internet, Intranet, LAN, Wide LAN (WLAN), or Storage Area Network (SAN), or a communication network by combining these networks. The storage device can access the device of the present disclosure through an external port. Also, a separate storage device may access the device of the present disclosure over the communication network.

In the specific embodiments of the present disclosure, the elements included in the invention are expressed in a singular or plural form. However, the singular or plural expression is appropriately selected according to a proposed situation for the convenience of explanation, and the present disclosure is not limited to a single element or a plurality of elements. The elements expressed in the plural form may be configured as a single element and the elements expressed in the singular form may be configured as a plurality of elements.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for operating a macro base station in a wireless communication system, the method comprising:
processing a control plane for a terminal;
determining a mobility threshold of the terminal based on a control plane load of the macro base station;
determining whether a mobility of the terminal is less than the mobility threshold of the terminal; and
in response to determining that the mobility of the terminal is less than the mobility threshold of the terminal, transmitting, to the terminal, a message for transferring the control plane of the terminal to be processed by at least one small base station,
wherein the mobility threshold of the terminal comprises a threshold for determining a level of the mobility of the terminal, and
wherein the mobility threshold of the terminal increases as the control plane load of the macro base station increases.

2. The method of claim 1, further comprising:
receiving data for determining the mobility,
wherein the data comprises at least one of a residence time for a last visited cell of the terminal, a measurement report of the terminal, a detection result of a reference signal by the terminal, a number of cell reselections by the terminal, a number of handovers by the terminal, a mobility speed of the terminal, and a selection by the terminal.

3. The method of claim 1, further comprising:
receiving information regarding the mobility determined by the terminal.

4. The method of claim 1, further comprising:
if the terminal enters a cell of the at least one small base station, determining the mobility.

5. The method of claim 4, further comprising:
if the mobility is less than the mobility threshold of the terminal, re-determining the mobility after a predefined time elapses from when the terminal enters the cell of the at least one small base station.

6. The method of claim 4, further comprising:
if the mobility is less than the mobility threshold of the terminal, transmitting, to the terminal, a message for transferring the control plane of the terminal to be processed by at least one small base station after a predefined time elapses from when the terminal enters the cell of the at least one small base station.

7. The method of claim 1,
wherein the control plane load is a load level of a plurality of control planes for terminals including the terminal served by the macro base station, and
wherein the plurality of control planes are processed by the macro base station.

8. A macro base station in a wireless communication system, the macro base station comprising:
a processor configured to process a control plane for a terminal,
determine a mobility threshold of the terminal based on a control plane load of the macro base station;
determine whether a mobility of the terminal is less than the mobility threshold of the terminal; and
at least one transceiver configured to transmit, to the terminal, a message for transferring the control plane of the terminal to be processed by at least one small base station in response to determining that the mobility of the terminal is less than the mobility threshold of the terminal,
wherein the mobility threshold of the terminal comprises a threshold for determining a level of the mobility of the terminal, and
wherein the mobility threshold of the terminal increases as the control plane load of the macro base station increases.

9. The macro base station of claim 8,
wherein the at least one transceiver is further configured to receive data for determining the mobility, and
wherein the data comprises at least one of a residence time for a last visited cell of the terminal, a measurement report of the terminal, a detection result of a reference signal by the terminal, a number of cell reselections by the terminal, a number of handovers by the terminal, a mobility speed of the terminal, and a selection by the terminal.

10. The macro base station of claim 8, wherein the at least one transceiver is further configured to receive information regarding the mobility determined by the terminal.

11. The macro base station of claim 8, wherein the load level is determined based on at least one of a resource block (RB) usage and a number of terminals connected to the macro base station.

12. The macro base station of claim 8, wherein the processor is further configured to, if the terminal enters a cell of the at least one ether small base station, determine the mobility.

13. The macro base station of claim 12, wherein the processor is further configured to, if the mobility is less than the mobility threshold of the terminal, re-determine the mobility after a predefined time elapses from when the terminal enters the cell of the at least one small base station.

14. The macro base station of claim 12, wherein the at least one transceiver is further configured to, if the mobility is less than the mobility threshold of the terminal, transmit, to the terminal, a message for transferring the control plane of the terminal to be processed by at least one small base station after a predefined time elapses from when the terminal enters the cell of the at least one small base station.

15. The macro base station of claim 12, wherein the processor is further configured to, if the terminal leaves the cell of the at least one small base station, control to process the control plane of the terminal in the macro base station.

16. The macro base station of claim 8,
wherein the control plane load is a load level of a plurality of control planes for terminals including the terminal served by the macro base station, and
wherein the plurality of control planes are processed by the macro base station.

17. A terminal in a wireless communication system, the terminal comprising:
at least one transceiver configured to:
transmit information regarding a mobility of the terminal, and
receive, from a macro base station, a message for transferring a control plane of the terminal to be processed by at least one small base station,
wherein the at least one small base station is selected based on a determining that a mobility of the terminal is less than a mobility threshold of the terminal by the macro base station,
wherein the mobility threshold of the terminal is determined based on a control plane load of the macro base station,
wherein the mobility threshold of the terminal comprises a threshold for determining a level of the mobility of the terminal, and
wherein the mobility threshold of the terminal increases as the control plane load of the macro base station increases.

18. The terminal of claim 17,
wherein the information regarding the mobility comprises data for determining the mobility, and
wherein the data comprises at least one of a residence time for a last visited cell of the terminal, a measurement report of the terminal, a detection result of a reference signal by the terminal, a number of cell reselections by the terminal, a number of handovers by the terminal, a mobility speed of the terminal, and a selection by the terminal.

19. The terminal of claim 17, wherein the information regarding the mobility comprises information indicating the mobility determined by the terminal.

20. The terminal of claim 17, further comprising a processor configured to determine the mobility of the terminal.

* * * * *